United States Patent
Shi

(10) Patent No.: US 11,229,043 B2
(45) Date of Patent: Jan. 18, 2022

(54) COMMUNICATION METHOD AND TERMINAL DEVICE

(71) Applicant: GUANGDONG OPPO MOBILE TELECOMMUNICATIONS CORP., LTD., Dongguan (CN)

(72) Inventor: Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/085,451

(22) Filed: Oct. 30, 2020

(65) Prior Publication Data

US 2021/0051694 A1 Feb. 18, 2021

Related U.S. Application Data

(63) Continuation of application No. PCT/CN2018/086314, filed on May 10, 2018.

(51) Int. Cl.
*H04W 72/12* (2009.01)

(52) U.S. Cl.
CPC ................. *H04W 72/1278* (2013.01)

(58) Field of Classification Search
CPC ............ H04W 72/00; H04W 72/1242; H04W 72/1278; H04W 72/1284
See application file for complete search history.

(56) References Cited

U.S. PATENT DOCUMENTS

| 2010/0098011 | A1* | 4/2010 | Pelletier | H04W 72/1242 370/329 |
|---|---|---|---|---|
| 2017/0118671 | A1* | 4/2017 | Lee | H04W 72/14 |
| 2017/0127433 | A1 | 5/2017 | Lin | |
| 2017/0280486 | A1* | 9/2017 | Lee | H04W 72/02 |
| 2017/0310433 | A1 | 10/2017 | Dinan | |
| 2019/0182896 | A1* | 6/2019 | Shrestha | H04W 72/14 |
| 2019/0349983 | A1* | 11/2019 | Loehr | H04W 52/242 |

FOREIGN PATENT DOCUMENTS

| CN | 101695194 A | 4/2010 |
|---|---|---|
| CN | 101772174 A | 7/2010 |
| CN | 101695194 B | 12/2011 |
| CN | 104025689 A | 9/2014 |
| CN | 104780134 A | 7/2015 |
| CN | 106856630 A | 6/2017 |
| CN | 107734703 A | 2/2018 |

(Continued)

OTHER PUBLICATIONS

Supplementary European Search Report issued in corresponding European Application No. EP 18917764 5, dated Mar. 24, 2021, 9 pages.

(Continued)

*Primary Examiner* — Mehmood B. Khan
*Assistant Examiner* — Zhaohui Yang
(74) *Attorney, Agent, or Firm* — Bayes PLLC

(57) ABSTRACT

Disclosed in the embodiments of the present disclosure are a communication method and a terminal device. The method includes determining, by a terminal device according to a first logical channel with to-be-transmitted data and an available uplink resource of the terminal device, whether to trigger a scheduling request (SR).

14 Claims, 2 Drawing Sheets

(56) References Cited

FOREIGN PATENT DOCUMENTS

| CN | 107872885 A | 4/2018 |
|---|---|---|
| RU | 2504126 C1 | 1/2014 |
| RU | 2510598 C2 | 3/2014 |
| RU | 2518088 C2 | 6/2014 |
| WO | 2011/139220 A1 | 11/2011 |
| WO | 2017150828 A1 | 9/2017 |
| WO | 2017197647 A1 | 11/2017 |
| WO | 2019/213893 A1 | 11/2019 |

OTHER PUBLICATIONS

First Official Action issued in corresponding Russian Application No. 2020139657, dated Apr. 26, 2021, 10 pages.
"Small correction on the SR triggering", Agenda Item: 10 3.1.6, Source: Oppo, 3GPP TSG-RAN2 #101 bis, R2-1804437, Sanya, China, Apr. 16-Apr. 20, 2018, 4 pages.
First Office Action issued in corresponding Chinese Application No. 202010706442.3, dated Aug. 30, 2021, 19 pages.
Notice of Priority Review of Patent Application issued in corresponding Chinese Application No. 202010706442.3, dated Aug. 19, 2021, 6 pages.
"SR configuration and UL data scheduling", Agenda item: 5.1.3.3.2, Source: Intel Corporation, 3GPP TSG RAN WG1 NR Ad-Hoc#2, R1-1710567, Qingdao, P.R. China Jun. 27-30, 2017, 5 pages.
First Office action issued in Corresponding Canadian Application No. 3,108,244 dated Dec. 2, 2021, 6 pages.

* cited by examiner

200

A terminal device determines, according to a first logical channel with to-be-transmitted data and an available uplink resource of the terminal device, whether to trigger a scheduling request (SR) — S210

Terminal device 300

Determining module 310

COMMUNICATION METHOD AND TERMINAL DEVICE

CROSS-REFERENCE TO RELATED APPLICATIONS

The present disclosure is a continuation of International Application No. PCT/CN2018/086314, filed on May 10, 2018, which is incorporated by reference in its entirety.

BACKGROUND

Embodiments of the present disclosure relate to the field of communications, and more specifically, to a communication method and a terminal device.

In the 5G new radio (NR) system, when a logical channel has to-be-transmitted data, a terminal device may send a scheduling request (SR) to a network device and obtain an uplink resource used for data transmission. However, when the terminal device has an available uplink resource (for example, a semi-static resource), how to trigger the SR is an urgent problem to be resolved.

SUMMARY

A communication method and a terminal device are provided, which can trigger a scheduling request (SR).

According to a first aspect, a communication method is provided, including determining, by a terminal device according to a first logical channel with to-be-transmitted data and an available uplink resource of the terminal device, whether to trigger a scheduling request (SR).

Therefore, according to the communication method of the embodiment of the present disclosure, a terminal device can determine, according to an available uplink resource of the terminal device and information of a logical channel with to-be-transmitted data, whether to trigger an SR, so that the SR can be timely triggered when necessary, to implement timely data transmission, and the SR is not triggered when unnecessary, thereby reducing signaling overheads.

In some possible implementations, the uplink resource includes a dynamically scheduled uplink resource and/or a semi-statically configured uplink resource.

Optionally, the dynamically scheduled uplink resource may be an uplink resource scheduled through a physical downlink control channel (PDCCH). The PDCCH may be scrambled by using a cell radio network temporary identifier (C-RNTI), may be scrambled by using a configured scheduling radio network temporary identifier (CS-RNTI), or may be scrambled by using another RNTI, which is not limited in the embodiment of the present disclosure.

Optionally, the semi-statically configured uplink resource includes a first configured uplink grant (type1 configured uplink grant) and a second configured uplink grant (type2 configured uplink grant). The type1 configured uplink grant may be an uplink resource configured by using radio resource control (RRC) signaling or other higher layer signaling. The type2 configured uplink grant may be an uplink resource configured by using higher layer signaling (for example, RRC signaling), and the uplink resource is activated or deactivated by using downlink control information (DCI).

In some possible implementations, when the terminal device determines whether to trigger the SR, a regular buffer status report (BSR) has been triggered by the first logical channel, and there is at least one regular BSR in a triggered and unsent state.

In some possible implementations, the determining, by a terminal device according to a first logical channel with to-be-transmitted data and an available uplink resource of the terminal device, whether to trigger a scheduling request (SR) includes:

determining, by the terminal device according to whether a logical channel parameter configured for the first logical channel meets a logical channel prioritization (LCP) restriction of the available uplink resource, whether to trigger the SR.

In some possible implementations, the first logical channel includes one logical channel, and the determining, by the terminal device according to whether a logical channel parameter configured for the first logical channel meets a logical channel prioritization (LCP) restriction of the available uplink resource, whether to trigger the SR includes:

determining not to trigger the SR if the logical channel parameter configured for the first logical channel meets the LCP restriction of the available uplink resource; or determining to trigger the SR if the logical channel parameter configured for the first logical channel does not meet the LCP restriction of the available uplink resource.

In some possible implementations, the first logical channel includes a plurality of logical channels, and the determining, by the terminal device according to whether a logical channel parameter configured for the first logical channel meets a logical channel prioritization (LCP) restriction of the available uplink resource, whether to trigger the SR includes:

determining not to trigger the SR if the logical channel parameter configured for each logical channel in the first logical channel meets the LCP restriction of the available uplink resource; or determining to trigger the SR if the logical channel parameter configured for at least one logical channel in the first logical channel does not meet the LCP restriction of the available uplink resource.

In some possible implementations, the logical channel parameter is at least one parameter configured for the first logical channel by a network device, and the at least one parameter is used for determining whether the to-be-transmitted data on the first logical channel can be transmitted on the available uplink resource.

In some possible implementations, the logical channel parameter configured for the first logical channel includes at least one of the following:

a first parameter used for indicating whether the to-be-transmitted data is allowed to be transmitted on a first configured uplink grant, a second parameter used for indicating whether the to-be-transmitted data is allowed to be transmitted on a second configured uplink grant, maximum physical uplink shared channel (PUSCH) transmission duration supported, an available subcarrier spacing, and an available carrier.

In some possible implementations, the LCP restriction of the uplink resource is used for indicating at least one of the following:

whether the to-be-transmitted data is allowed to be transmitted on the first configured uplink grant, whether the to-be-transmitted data is allowed to be transmitted on the second configured uplink grant, and whether the to-be-transmitted data is allowed to be transmitted on the dynamically scheduled uplink resource.

In some possible implementations, the first configured uplink grant is a granted resource configured by means of semi-static configuration, and the second configured uplink grant is a granted resource configured by means of semi-static configuration and dynamic triggering.

According to a second aspect, a terminal device is provided. The terminal device is configured to perform the method in the first aspect or any possible implementation of the first aspect. Specifically, the terminal device includes function modules configured to perform the method in the first aspect or any possible implementation of the first aspect.

According to a third aspect, a terminal device is provided, and the device includes a processor and a memory. The memory is configured to store a computer program. The processor is configured to invoke and run the computer program stored in the memory, to perform the method in the first aspect or the implementations of the first aspect.

According to a fourth aspect, a chip is provided and is configured to implement the method in the first aspect or the implementations of the first aspect.

Specifically, the chip includes a processor, configured to invoke a computer program from a memory and run the computer program, to cause a device having the chip installed therein to perform the method in the first aspect or the implementations of the first aspect.

According to a fifth aspect, a computer-readable storage medium is provided and is configured to store a computer program, where the computer program causes a computer to perform the method in the first aspect or the implementations of the first aspect.

According to a sixth aspect, a computer program product is provided and includes a computer program instruction, where the computer program instruction causes a computer to perform the method in the first aspect or the implementations of the first aspect.

According to a seventh aspect, a computer program is provided. When run on a computer, the computer program causes the computer to perform the method in the first aspect or the implementations of the first aspect.

DETAILED DESCRIPTION

The technical solutions in the embodiments of the present disclosure are described below with reference to the accompanying drawings in the embodiments of the present disclosure.

It should be understood that the terms "system" and "network" in the present disclosure are usually interchangeably used in this specification. The term "and/or" in this specification is merely an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The technical solutions according to the embodiments of the present disclosure may be applied to a variety of communications systems, such as a Global System for Mobile communications ("GSM" for short) system, a Code Division Multiple Access ("CDMA" for short) system, a Wideband Code Division Multiple Access ("WCDMA" for short) system, a General Packet Radio Service ("GPRS" for short), a Long Term Evolution ("LTE" for short) system, an LTE Frequency Division Duplex ("FDD" for short) system, an LTE Time Division Duplex ("TDD" for short), a Universal Mobile Telecommunication System ("UMTS" for short), a Worldwide Interoperability for Microwave Access ("WiMAX" for short) communications system, a future 5G system, or the like.

Figures 1, 2, 3:
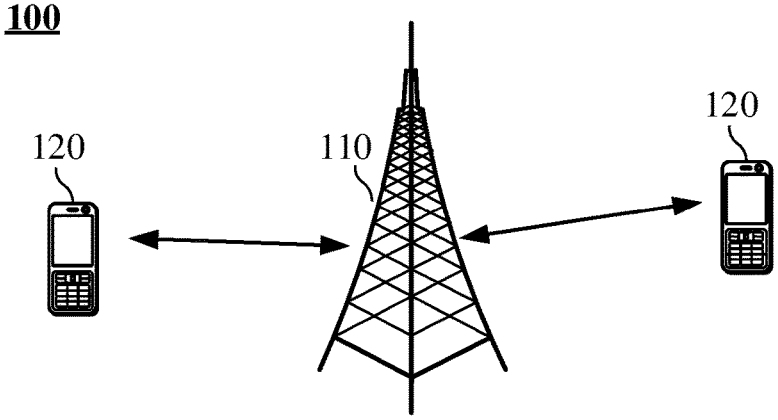
FIG. 1 is a schematic diagram of an application scenario according to an embodiment of the present disclosure.
FIG. 2 is a schematic flowchart of a communication method according to an embodiment of the present disclosure.
FIG. 3 is a schematic block diagram of a terminal device according to an embodiment of the present disclosure.

FIG. 1 shows a wireless communications system 100 to which an embodiment of the present disclosure is applied. The wireless communications system 100 may include a network device 110. The network device 100 may be a device communicating with a terminal device. The network device 100 may provide communications coverage for a particular geographic area and may communicate with a terminal device (for example, UE) located within the coverage area. Optionally, the network device 100 may be a base transceiver station (BTS) in a GSM system or CDMA system, or may be a NodeB (NB) in a WCDMA system, or may be an evolved NodeB (eNB or eNodeB) in an LTE system, or a wireless controller in a cloud radio access network (CRAN), or the network device may be a relay station, an access point, an in-vehicle device, a wearable device, a network side device in a future 5G network, a network device in a future evolved public land mobile network (PLMN), or the like.

The wireless communications system 100 further includes at least one terminal device 120 located within the coverage range of the network device 110. The terminal device 120 may be mobile or fixed. Optionally, the terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved PLMN, or the like.

A communication method in this embodiment of the present disclosure is described below with reference to FIG. 2. It should be understood that FIG. 2 is a schematic flowchart of a communication method according to an embodiment of the present disclosure and shows detailed communication steps or operations of the method. However, the steps or operations are only examples, and other operations or variations of the operations in FIG. 2 may also be performed in this embodiment of the present disclosure.

FIG. 2 is a schematic flowchart of a communication method 200 according to an embodiment of the present disclosure. The method 200 may be performed by a terminal device in a communications system. As shown in FIG. 2, the communication method 200 includes:

S210. A terminal device determines, according to a first logical channel with to-be-transmitted data and an available uplink resource of the terminal device, whether to trigger a scheduling request (SR).

Specifically, when the first logical channel has to-be-transmitted data, the terminal device may send an SR to a network device and request to obtain an uplink resource used for data transmission. If an available uplink resource, such as a semi-statically configured uplink resource, has been allocated to the terminal device, it is determined, according to attribute information or parameter information of the available uplink resource, whether the terminal device triggers the SR. For example, if the available uplink resource can meet a transmission requirement of the to-be-transmitted data on the first logical channel, the terminal device may determine not to trigger the SR, that is, not to send the SR to the network device. Further, the available uplink resource may be used for data transmission, thereby reducing signaling overheads. Alternatively, if the available uplink resource cannot meet the transmission requirement of the to-be-transmitted data on the first logical channel, the terminal device may determine to trigger the SR, and further, may send the SR to the network device to obtain an uplink resource meeting the transmission requirement, thereby implementing timely transmission of the to-be-transmitted data on the first logical channel.

Therefore, according to the communication method of the embodiment of the present disclosure, a terminal device can determine, according to an available uplink resource of the terminal device and information of a logical channel with to-be-transmitted data, whether to trigger an SR, so that the SR can be timely triggered when necessary, to implement timely data transmission, and the SR is not triggered when unnecessary, thereby reducing signaling overheads.

Optionally, in this embodiment of the present disclosure, the first logical channel may include one logical channel or a group of logical channels, which is not limited in this embodiment of the present disclosure.

It should be noted that, when the terminal device determines whether to trigger the SR, a buffer status report (BSR) has been triggered by the first logical channel, and at least one regular BSR in a pending state (that is, a triggered and unsent state) exists in the terminal device. The at least one regular BSR may be triggered by one logical channel or may be triggered by a plurality of logical channels. The at least one regular BSR may include the regular BSR triggered by the first logical channel.

Optionally, in this embodiment of the present disclosure, the uplink resource available to the terminal device may include a dynamically scheduled uplink resource and/or a semi-statically configured uplink resource.

Optionally, in this embodiment of the present disclosure, the dynamically scheduled uplink resource may be an uplink resource scheduled through a physical downlink control channel (PDCCH). The PDCCH may be scrambled by using a cell radio network temporary identifier (C-RNTI), may be scrambled by using a configured scheduling radio network temporary identifier (CS-RNTI), or may be scrambled by using another RNTI, which is not limited in the embodiment of the present disclosure.

Optionally, in this embodiment of the present disclosure, the semi-statically configured uplink resource includes a first configured uplink grant (type1 configured uplink grant) and a second configured uplink grant (type2 configured uplink grant). The type1 configured uplink grant may be an uplink resource configured by radio resource control (RRC) signaling or other higher layer signaling. The type2 configured uplink grant may be an uplink resource configured by higher layer signaling (for example, RRC signaling), and the uplink resource is activated or deactivated by using downlink control information (DCI). That is, the first configured uplink grant is an uplink granted resource configured by means of semi-static configuration, and the second configured uplink grant is an uplink granted resource configured by means of semi-static configuration and dynamic triggering.

Optionally, in some embodiments, S210 may specifically include that the terminal device determines, according to whether a logical channel parameter configured for the first logical channel meets a logical channel prioritization (LCP) restriction of the available uplink resource, whether to trigger the SR.

It should be understood that, herein, the logical channel parameter configured for the first logical channel may include at least one parameter configured for the first logical channel by the network device, and the at least one parameter is used for determining whether the to-be-transmitted data on the first logical channel can be transmitted on the available uplink resource.

Optionally, in some embodiments, the logical channel parameter configured for the first logical channel includes at least one of the following: a first parameter used for indicating whether the to-be-transmitted data is allowed to be transmitted on the first configured uplink grant, a second parameter used for indicating whether the to-be-transmitted data is allowed to be transmitted on the second configured uplink grant, maximum physical uplink shared channel (PUSCH) transmission duration supported, an available subcarrier spacing, and an available carrier.

The maximum PUSCH transmission duration supported may alternatively be understood as a maximum PUSCH length supported, that is, the longest duration in which data transmission can be performed. The available subcarrier spacing (SCS) may alternatively be understood as an available basic parameter set. The available carrier may be referred to as an available physical carrier (allowed serving cells).

Optionally, in this embodiment of the present disclosure, the LCP restriction of the uplink resource may be understood as a manner of selecting a logical channel and putting to-be-transmitted data on the logical channel onto the uplink resource for transmission in a case that the terminal device obtains the available uplink resource. Therefore, it may be determined, according to the LCP restriction of the uplink resource, whether the to-be-transmitted data on the logical channel can be transmitted through the uplink resource. For example, the following steps may be specifically included:

First, logical channels are selected.

Specifically, the logical channel parameter configured for each logical channel is compared with a parameter of the uplink resource. For example, if the maximum PUSCH length supported by the logical channel is greater than a PUSCH length of the uplink resource, it may be determined that the data on the logical channel can be transmitted on the uplink resource, and if not, it is determined that the data on the logical channel cannot be transmitted on the uplink resource.

Further, the selected logical channels may be ranked, for example, according to the logical channel parameters configured for the logical channels or the logical channel prioritization.

Next, data that is on each ranked logical channel and that can be transmitted on the uplink resource may be determined. For example, data that is on each logical channel and that can be transmitted on the uplink resource may be determined according to the logical channel parameter configured for each logical channel.

Therefore, the LCP restriction of the uplink resource may be understood as the attribute information or the parameter information of the uplink resource, for example, the maximum PUSCH length supported by the uplink resource, the available physical carrier, the available subcarrier spacing, and whether the to-be-transmitted data on the logical channel is allowed to be transmitted on the uplink resource. In this case, the terminal device may determine, according to the logical channel parameter configured for the logical channel and the LCP restriction of the uplink resource, whether the to-be-transmitted data on the logical channel can be transmitted on the uplink resource, that is, whether the uplink resource can meet the transmission condition of the to-be-transmitted data.

Further, if it is determined that the to-be-transmitted data on the logical channel can be transmitted on the uplink resource, the terminal device may not trigger the SR, thereby reducing signaling overheads. Alternatively, if the to-be-transmitted data on the logical channel cannot be transmitted on the uplink resource, the terminal device may timely trigger the SR, so that the network device can timely schedule the to-be-transmitted data.

Optionally, in this embodiment of the present disclosure, the first logical channel may include one logical channel, or may include a plurality of logical channels. The trigger condition of the SR is specifically described below with reference to two scenarios.

Optionally, as an embodiment, the first logical channel includes one logical channel, and the determining, by the terminal device according to whether the logical channel parameter configured for the first logical channel meets the logical channel prioritization (LCP) restriction of the available uplink resource, whether to trigger the SR includes determining not to trigger the SR if the logical channel parameter configured for the first logical channel meets the LCP restriction of the available uplink resource; or determining to trigger the SR if the logical channel parameter configured for the first logical channel does not meet the LCP restriction of the available uplink resource.

Specifically, when the first logical channel includes one logical channel, the terminal device may only determine whether the logical channel parameter configured for the one logical channel meets the LCP restriction of the available uplink resource of the terminal device. For example, if the available carrier configured for the first logical channel is a physical carrier 2, and the available uplink resource is a resource on a serving cell 1, the terminal device may determine that the logical channel parameter configured for the first logical channel does not meet the LCP restriction of the available uplink resource. Alternatively, if the maximum supported PUSCH transmission duration configured for the first logical channel is greater than the PUSCH transmission duration of the available uplink resource, the terminal device may determine that the logical channel parameter configured for the first logical channel meets the LCP restriction of the available uplink resource. Further, the terminal device may determine, according to the result of the determining, whether to trigger the SR. If the logical channel parameter configured for the first logical channel meets the LCP restriction of the available uplink resource of the terminal device, the terminal device may determine not to trigger the SR, thereby reducing signaling overheads. Alternatively, if the logical channel parameter configured for the first logical channel does not meet the LCP restriction of the available uplink resource of the terminal device, the terminal device may determine to trigger the SR, thereby timely sending the SR to the network device to implement timely transmission of the data on the first logical channel.

Optionally, as another embodiment, the first logical channel includes a plurality of logical channels, and the terminal device determining, according to whether a logical channel parameter configured for the first logical channel meets a logical channel prioritization (LCP) restriction of the available uplink resource, whether to trigger the SR includes determining not to trigger the SR if the logical channel parameter configured for each logical channel in the first logical channel meets the LCP restriction of the available uplink resource; or determining to trigger the SR if the logical channel parameter configured for at least one logical channel in the first logical channel does not meet the LCP restriction of the available uplink resource.

Specifically, when the first logical channel includes a plurality of logical channels, the terminal device may determine whether the logical channel parameter configured for each logical channel of the plurality of logical channels meets the LCP restriction of the available uplink resource of the terminal device, and further determine, according to the result of the determining, whether to trigger the SR. For example, if the logical channel parameter configured for one logical channel (for example, a logical channel 1) in the plurality of logical channels does not meet the LCP restriction of the available uplink resource, that is, the data on the logical channel 1 cannot be transmitted through the available uplink resource, in order to implement timely transmission of the data on the logical channel 1, the terminal device may determine to trigger the SR, thereby timely requesting the uplink resource from the network device, so as to timely transmit the data on the logical channel 1. Alternatively, if the logical channel parameter configured for each logical channel of the plurality of logical channels meets the LCP restriction of the available uplink resource, that is, the to-be-transmitted data on each logical channel of the plurality of logical channels can be transmitted through the available uplink resource, the terminal device may determine not to trigger the SR, and use the available uplink resource for data transmission, thereby reducing signaling overheads.

That is, in this embodiment of the present disclosure, it is first determined whether the logical channel parameter configured for the logical channel having a to-be-transmitted service meets the LCP restriction of the allocated uplink resource of the terminal device, so that the terminal device determines whether to trigger the SR. For example, for a delay-sensitive logical channel, when the to-be-transmitted service is an ultra-reliable and low latency communication (URLLC) service, if the logical channel parameter configured for the logical channel does not meet the LCP restriction of the allocated uplink resource, the SR may be timely triggered, so that the network device can quickly schedule the to-be-transmitted service on the logical channel.

The triggering manner of the SR is described below with reference to specific embodiments.

Embodiment 1

The type1 configured uplink grant is configured on the terminal device. The network device may configure the LCP restriction of the type1 configured uplink grant. For the logical channel triggering the regular BSR, the terminal device may determine whether the logical channel parameter configured for the logical channel meets the LCP restriction of the type1 configured uplink grant. If the LCP restriction is met, the SR is not triggered, and if not, the SR is triggered.

Embodiment 2

The type2 configured uplink grant is configured on the terminal device, and the type2 configured uplink grant is in an activated state. The network device may configure the LCP restriction of the type2 configured uplink grant. For the logical channel triggering the regular BSR, the terminal device may determine whether the logical channel parameter configured for the logical channel meets the LCP restriction of the type2 configured uplink grant. If the LCP restriction is met, the SR is not triggered, and if not, the SR is triggered.

Embodiment 3

The dynamically scheduled uplink resource is allocated to the terminal device. The network device may configure the LCP restriction of the dynamically scheduled uplink resource. For the logical channel triggering the regular BSR, the terminal device may determine whether the logical channel parameter configured for the logical channel meets the LCP restriction of the dynamically scheduled uplink resource. If the LCP restriction is met, the SR is not triggered, and if not, the SR is triggered.

In this embodiment of the present disclosure, the available uplink resource of the terminal device may include a dynamically scheduled and/or semi-statically configured uplink resource. Therefore, the network device may configure a corresponding LCP restriction for the semi-statically configured uplink resource. In this case, the logical channel having the to-be-transmitted data may determine, according to the LCP restriction of the semi-statically configured uplink resource, whether to trigger the SR, instead of directly using the semi-statically configured uplink resource to perform data transmission. This helps to avoid a transmission exception resulting from using the semi-statically configured uplink resource to perform data transmission when the LCP restriction of the semi-statically configured uplink resource is not met. Moreover, the SR can be timely triggered, helping the network device to timely schedule the to-be-transmitted data on the logical channel.

Optionally, in some embodiments, after S210, the method 200 may further include the terminal device sends the SR to the network device, if determining to trigger the SR; or the terminal device does not send the SR to the network device, if determining not to trigger the SR.

Therefore, according to the communication method of the embodiment of the present disclosure, a terminal device can determine, according to an available uplink resource of the terminal device and information of a logical channel with to-be-transmitted data, whether to trigger an SR, so that the SR can be timely triggered when necessary, to implement timely data transmission, and the SR is not triggered when unnecessary, thereby reducing signaling overheads.

Method embodiments of the present disclosure are described above in detail with reference to FIG. 2, and apparatus embodiments of the present disclosure are described below in detail with reference to FIG. 3 to FIG. 5. It should be understood that, the apparatus embodiments and the method embodiments correspond to each other. For similar descriptions, refer to the method embodiments.

FIG. 3 is a schematic block diagram of a terminal device according to an embodiment of the present disclosure. As shown in FIG. 3, the terminal device 300 includes a determining module 310, configured to determine, according to a first logical channel with to-be-transmitted data and an available uplink resource of the terminal device, whether to trigger a scheduling request (SR).

Optionally, in some embodiments, the uplink resource includes a dynamically scheduled uplink resource and/or a semi-statically configured uplink resource.

Optionally, in some embodiments, when the terminal device determines whether to trigger the SR, a regular buffer status report (BSR) has been triggered by the first logical channel, and there is at least one regular BSR in a triggered and unsent state.

In some embodiments, the determining module 310 is further configured to determine whether to trigger the SR according to whether a logical channel parameter configured for the first logical channel meets a logical channel prioritization (LCP) restriction of the available uplink resource.

Optionally, in some embodiments, the first logical channel includes one logical channel, and the determining module 310 is specifically configured to determine not to trigger the SR if the logical channel parameter configured for the first logical channel meets the LCP restriction of the available uplink resource; or determine to trigger the SR if the logical channel parameter configured for the first logical channel does not meet the LCP restriction of the available uplink resource.

Optionally, in some embodiments, the first logical channel includes a plurality of logical channels, and the determining module 310 is specifically configured to determine not to trigger the SR if the logical channel parameter configured for each logical channel in the first logical channel meets the LCP restriction of the available uplink resource; or determine to trigger the SR if the logical channel parameter configured for at least one logical channel in the first logical channel does not meet the LCP restriction of the available uplink resource.

Optionally, in some embodiments, the logical channel parameter is at least one parameter configured for the first logical channel by a network device, and the at least one parameter is used for determining whether the to-be-transmitted data on the first logical channel can be transmitted on the available uplink resource.

Optionally, in some embodiments, the logical channel parameter configured for the first logical channel includes at least one of the following: a first parameter used for indicating whether the to-be-transmitted data is allowed to be transmitted on a first configured uplink grant, a second parameter used for indicating whether the to-be-transmitted data is allowed to be transmitted on a second configured uplink grant, maximum physical uplink shared channel (PUSCH) transmission duration supported, an available subcarrier spacing, and an available carrier.

Optionally, in some embodiments, the LCP restriction of the uplink resource is used for indicating at least one of the following: whether the to-be-transmitted data is allowed to be transmitted on the first configured uplink grant, whether the to-be-transmitted data is allowed to be transmitted on the second configured uplink grant, and whether the to-be-transmitted data is allowed to be transmitted on the dynamically scheduled uplink resource.

Optionally, in some embodiments, the first configured uplink grant is a granted resource configured by means of semi-static configuration, and the second configured uplink grant is a granted resource configured by means of semi-static configuration and dynamic triggering.

Optionally, in some embodiments, the terminal device 300 may further include a communication module, configured to send the SR to the network device when it is determined to trigger the SR; or not to send the SR to the network device when it is determined not to trigger the SR.

It should be understood that the terminal device 300 in this embodiment of the present disclosure may correspond to the terminal device in the method embodiments of the present disclosure, and the foregoing and other operations and/or functions of the units in the terminal device 300 are respectively configured to implement corresponding procedures of the terminal device in the method 200 shown in FIG. 2. For brevity, details are not described herein again.

Figure 4:
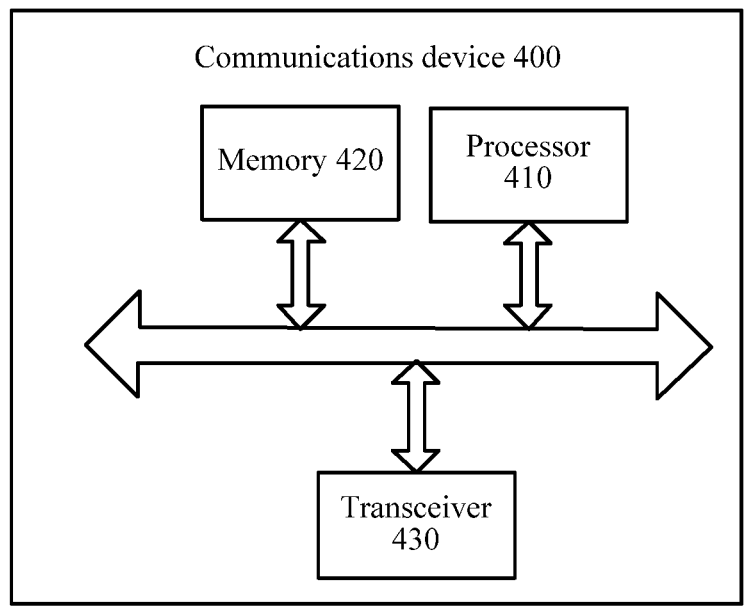
FIG. 4 is a schematic block diagram of a communications device according to an embodiment of the present disclosure.

FIG. 4 is a schematic block diagram of a communications device 400 according to an embodiment of the present disclosure. The communications device 400 shown in FIG. 4 includes a processor 410. The processor 410 may invoke a computer program from a memory and run the computer program, to implement the method in the embodiments of the present disclosure.

Optionally, as shown in FIG. 4, the communications device 400 may further include a memory 420. The processor 410 may invoke the computer program from the memory 420 and run the computer program, to implement the method in the embodiments of the present disclosure.

The memory 420 may be a component independent of the processor 410 or may be integrated into the processor 410.

Optionally, as shown in FIG. 4, the communications device 400 may further include a transceiver 430. The processor 410 may control the transceiver 430 to communicate with another device, and specifically, the transceiver 430 may send information or data to another device, or receive information or data sent by another device.

The transceiver 430 may include a transmitter and a receiver. The transceiver 430 may further include an antenna. There may be one or more antennas.

Optionally, the communications device 400 may be the terminal device in the embodiments of the present disclosure, and the communications device 400 can implement corresponding procedures implemented by the terminal device in various methods in the embodiments of the present disclosure. For brevity, details are not described herein again.

Figure 5:
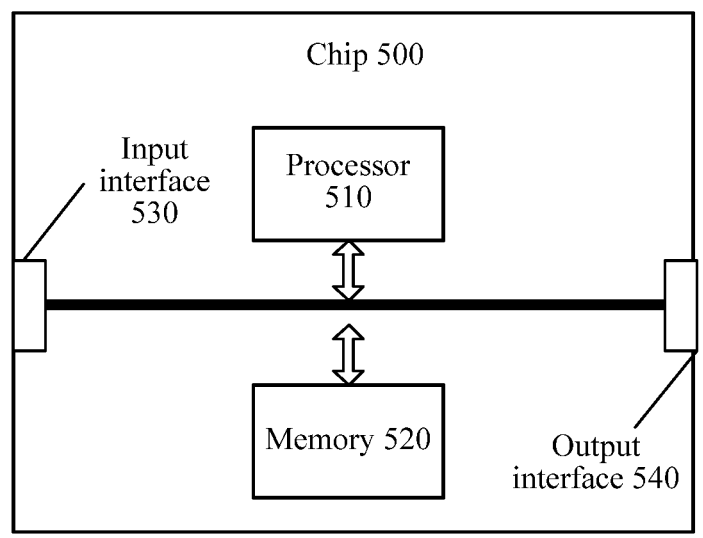
FIG. 5 is a schematic block diagram of a chip according to an embodiment of the present disclosure.

FIG. 5 is a schematic block diagram of a chip 500 according to an embodiment of the present disclosure. The chip 500 shown in FIG. 5 includes a processor 510. The processor 510 may invoke a computer program from a memory and run the computer program, to implement the method in the embodiments of the present disclosure.

Optionally, as shown in FIG. 5, the chip 500 may further include a memory 520. The processor 510 may invoke the computer program from the memory 520 and run the computer program, to implement the method in the embodiments of the present disclosure.

The memory 520 may be a component independent of the processor 510 or may be integrated into the processor 510.

Optionally, the chip 500 may further include an input interface 530. The processor 510 may control the input interface 530 to communicate with another device or chip, and specifically, the input interface 530 may obtain information or data sent by another device or chip.

Optionally, the chip 500 may further include an output interface 540. The processor 510 may control the output interface 540 to communicate with another device or chip, and specifically, the output interface 540 may output information or data to another device or chip.

Optionally, the chip may be applied to the terminal device in the embodiments of the present disclosure, and the chip can implement corresponding procedures implemented by the terminal device in various methods in the embodiments of the present disclosure. For brevity, details are not described herein again.

It should be noted that the chip mentioned in the embodiments of the present disclosure may also be referred to as a system-level chip, a system chip, a chip system, a system on chip, or the like.

The foregoing processor may be a general-purpose processor, a digital signal processor (DSP), a field-programmable gate array (FPGA), an application-specific integrated circuit (ASIC) or another programmable logic device, a transistor logic device, or a discrete hardware component. The foregoing general-purpose processor may be a microprocessor, or may be any conventional processor, or the like.

The foregoing memory may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM).

It should be understood that the memory is an example but is not intended for limitation. For example, the memory in the embodiments of the present disclosure may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like. That is, the memory described in this embodiment of the present disclosure is intended to include but is not limited to these memories and any other suitable type of memory.

An embodiment of the present disclosure further provides a computer-readable storage medium. The computer-readable storage medium stores one or more programs, the one or more programs include an instruction, and when executed by a portable electronic device including a plurality of applications, the instruction can cause the portable electronic device to perform the method in the embodiment shown in FIG. 2.

An embodiment of the present disclosure further provides a computer program. The computer program includes an instruction, and when executed by a computer, the computer program causes the computer to perform a corresponding procedure of the method in the embodiment shown in FIG. 2.

A person of ordinary skill in the art may be aware that, in combination with the examples described in the embodiments disclosed in this specification, units and algorithm steps may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, but it should not be considered that the implementation goes beyond the scope of the present disclosure.

A person skilled in the art may clearly understand that, for simple and clear description, for specific work processes of the foregoing described system, apparatus, and unit, reference may be made to the corresponding process in the foregoing method embodiments, and details are not described herein again.

In the several embodiments provided in the present disclosure, it should be understood that the disclosed system, apparatus, and method may be implemented in other manners. For example, the apparatus embodiments described above are merely examples. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A method for communication, comprising:
    determining, by a terminal device according to a first logical channel with to-be-transmitted data and an available uplink resource of the terminal device, whether to trigger a scheduling request (SR), the first logical channel comprising a plurality of logical channels, wherein the uplink resource comprises a semi-statically configured uplink resource;
    determining whether each logical channel in the first logical channel meets a logical channel prioritization of the available uplink resource; and
    triggering the SR based on the determination whether to trigger and the determination whether each logical channel in the first logical channel meets a logical channel prioritization of the available uplink resource,
    wherein the determining, by a terminal device according to a first logical channel with to-be-transmitted data and an available uplink resource of the terminal device, whether to trigger a scheduling request (SR) comprises:
        determining, by the terminal device according to whether a logical channel parameter configured for the first logical channel meets a logical channel prioritization (LCP) restriction of the available uplink resource, whether to trigger the SR; and
    wherein determining, by the terminal device according to whether a logical channel parameter configured for the first logical channel meets a logical channel prioritization (LCP) restriction of the available uplink resource, whether to trigger the SR, comprises:
        determining, by the terminal device according to whether the logical channel parameter configured for the first logical channel matches a parameter of the available uplink resource, whether to trigger the SR.

2. The method according to claim 1, wherein when the terminal device determines whether to trigger the SR, a regular buffer status report (BSR) has been triggered by the first logical channel, and at least one triggered regular BSR is in a pending state.

3. The method according to claim 1, wherein the determining, by the terminal device according to whether a logical channel parameter configured for the first logical channel meets a logical channel prioritization (LCP) restriction of the available uplink resource, whether to trigger the SR comprises:
    determining not to trigger the SR if the logical channel parameter configured for each logical channel in the first logical channel meets the LCP restriction of the available uplink resource; or
    determining to trigger the SR if the logical channel parameter configured for at least one logical channel in the first logical channel does not meet the LCP restriction of the available uplink resource.

4. The method according to claim 1, wherein the logical channel parameter is at least one parameter configured for the first logical channel by a network device, and the at least one parameter is used for determining whether the to-be-transmitted data on the first logical channel can be transmitted on the available uplink resource.

5. The method according to claim 4, wherein the logical channel parameter configured for the first logical channel comprises at least one of the following:
    a first parameter used for indicating whether the to-be-transmitted data is allowed to be transmitted on a first configured uplink grant;
    a second parameter used for indicating whether the to-be-transmitted data is allowed to be transmitted on a second configured uplink grant;
    maximum physical uplink shared channel (PUSCH) transmission duration supported;
    an available subcarrier spacing; or
    an available carrier.

6. The method according to claim 5, wherein the first configured uplink grant is a granted resource configured by semi-static configuration, and the second configured uplink grant is a granted resource configured by semi-static configuration and dynamic triggering.

7. The method according to claim 1, wherein the LCP restriction of the uplink resource is used for indicating at least one of the following:
    whether the to-be-transmitted data is allowed to be transmitted on a first configured uplink grant;
    whether the to-be-transmitted data is allowed to be transmitted on a second configured uplink grant; or
    whether the to-be-transmitted data is allowed to be transmitted on a dynamically scheduled uplink resource.

8. A terminal device, comprising: a processor and a memory, wherein the processor is configured to execute instructions stored by the memory;
   wherein when the processor executes the instructions stored in the memory, the terminal device is caused to determine, according to a first logical channel with to-be-transmitted data and an available uplink resource of the terminal device, whether to trigger a scheduling request (SR), the first logical channel comprising a plurality of logical channels, wherein the uplink resource comprises a semi-statically configured uplink resource;
   wherein the terminal device causes to determine whether each logical channel in the first logical channel meets a logical channel prioritization of the available uplink resource;
   wherein when the processor executes the instructions stored in the memory, the terminal device is caused to trigger the SR based on the determination whether to trigger and the determination whether each logical channel in the first logical channel meets a logical channel prioritization of the available uplink resource;
   wherein the determining according to a first logical channel with to-be-transmitted data and an available uplink resource of the terminal device, whether to trigger a scheduling request (SR) comprises:
      determining according to whether a logical channel parameter configured for the first logical channel meets a logical channel prioritization (LCP) restriction of the available uplink resource, whether to trigger the SR; and
   wherein determining according to whether a logical channel parameter configured for the first logical channel meets a logical channel prioritization (LCP) restriction of the available uplink resource, whether to trigger the SR, comprises:
      determining according to whether the logical channel parameter configured for the first logical channel matches a parameter of the available uplink resource, whether to trigger the SR.

9. The terminal device according to claim 8, wherein when the terminal device determines whether to trigger the SR, a regular buffer status report (BSR) has been triggered by the first logical channel, and there is at least one triggered regular BSR is in a pending state.

10. The terminal device according to claim 8, wherein when the processor executes the instructions stored in the memory, the terminal device is caused to:
   determine not to trigger the SR if the logical channel parameter configured for each logical channel in the first logical channel meets the LCP restriction of the available uplink resource; or
   determine to trigger the SR if the logical channel parameter configured for at least one logical channel in the first logical channel does not meet the LCP restriction of the available uplink resource.

11. The terminal device according to claim 8, wherein the logical channel parameter is at least one parameter configured for the first logical channel by a network device, and the at least one parameter is used for determining whether the to-be-transmitted data on the first logical channel can be transmitted on the available uplink resource.

12. The terminal device according to claim 11, wherein the logical channel parameter configured for the first logical channel comprises at least one of the following:
   a first parameter used for indicating whether the to-be-transmitted data is allowed to be transmitted on a first configured uplink grant;
   a second parameter used for indicating whether the to-be-transmitted data is allowed to be transmitted on a second configured uplink grant;
   maximum physical uplink shared channel (PUSCH) transmission duration supported;
   an available subcarrier spacing; and
   an available carrier.

13. The terminal device according to claim 12, wherein the first configured uplink grant is a granted resource configured by semi-static configuration, and the second configured uplink grant is a granted resource configured by semi-static configuration and dynamic triggering.

14. The terminal device according to claim 8, wherein the LCP restriction of the uplink resource is used for indicating at least one of the following:
   whether the to-be-transmitted data is allowed to be transmitted on a first configured uplink grant;
   whether the to-be-transmitted data is allowed to be transmitted on a second configured uplink grant; or
   whether the to-be-transmitted data is allowed to be transmitted on a dynamically scheduled uplink resource.

* * * * *